US011438711B2

(12) United States Patent
Sabin et al.

(10) Patent No.: US 11,438,711 B2
(45) Date of Patent: Sep. 6, 2022

(54) HEARING ASSIST DEVICE EMPLOYING DYNAMIC PROCESSING OF VOICE SIGNALS

(71) Applicant: Bose Corporation, Framingham, MA (US)

(72) Inventors: Andrew Todd Sabin, Chicago, IL (US); Patrick William Buzza, Stoughton, MA (US); Dale Ian McElhone, Marlborough, MA (US); Jahn Dmitri Eichfeld, Natick, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/864,656

(22) Filed: May 1, 2020

(65) Prior Publication Data

US 2021/0345047 A1 Nov. 4, 2021

(51) Int. Cl.
*H04R 25/00* (2006.01)
*G10L 25/84* (2013.01)
*G10L 21/0364* (2013.01)

(52) U.S. Cl.
CPC ........ *H04R 25/505* (2013.01); *G10L 21/0364* (2013.01); *G10L 25/84* (2013.01); *H04R 2225/43* (2013.01); *H04R 2460/01* (2013.01)

(58) Field of Classification Search
CPC .... H04R 25/505; G10L 21/0364; G10L 25/84
See application file for complete search history.

(56) References Cited

U.S. PATENT DOCUMENTS

| | | | |
|---|---|---|---|
| 10,972,834 B1* | 4/2021 | Yen | H04R 1/1083 |
| 2014/0278394 A1* | 9/2014 | Bastyr | G10L 21/0208 |
| | | | 381/92 |
| 2016/0267899 A1* | 9/2016 | Gauger, Jr. | H04R 1/10 |
| 2017/0148428 A1* | 5/2017 | Thuy | H04R 1/1083 |
| 2017/0251297 A1* | 8/2017 | Darlington | G10K 11/17885 |
| 2019/0306608 A1* | 10/2019 | Yeo | G10L 21/034 |
| 2020/0111482 A1* | 4/2020 | Chae | G10L 15/32 |
| 2021/0118461 A1* | 4/2021 | Boeen | G10L 17/06 |

OTHER PUBLICATIONS

Ding et al., "Personal VAD: Speaker-Conditioned Voice Activity Detection," Google Inc., Texas A&M University, Aug. 12, 2019, 5 pages.
Wang et al., "VoiceFilter: Targeted Voice Separation by Speaker-Conditioned Spectrogram Masking," Google Inc., Idiap Research Institute, EPFL, Jun. 19, 2019, 5 pages.

* cited by examiner

*Primary Examiner* — Simon King
(74) *Attorney, Agent, or Firm* — Hoffman Warnick LLC

(57) ABSTRACT

Various implementations include systems for processing audio signals. In particular implementations, a system includes at least one microphone configured to capture acoustic signals; a wearable hearing assist device configured to amplify captured acoustic signals from the at least one microphone and output amplified audio signals to a transducer; a voice activity detector (VAD) configured to detect voice signals of a user from the captured acoustic signals; and a voice suppression system configured to suppress the voice signals of the user from the amplified audio signals being output to the transducer.

19 Claims, 5 Drawing Sheets

HEARING ASSIST DEVICE EMPLOYING DYNAMIC PROCESSING OF VOICE SIGNALS

TECHNICAL FIELD

This disclosure generally relates to wearable hearing assist devices. More particularly, the disclosure relates to dynamically processing user voice signals in wearable hearing assist devices.

BACKGROUND

Wearable hearing assist devices can significantly improve the hearing experience for a user. For instance, such devices may employ technologies such as active noise reduction (ANR) for countering unwanted environmental noise. Additionally, such devices typically employ one or more microphones and amplification components to amplify desirable sounds such as the voice or voices of others speaking to the user. Wearable hearing assist devices may come in various form factors, e.g., headphones, earbuds, audio glasses, etc. However, processing acoustic signals, such as user voice signals, continues to present various technical challenges.

SUMMARY

All examples and features mentioned below can be combined in any technically possible way.

Systems and approaches are disclosed that employ a wearable hearing assist device to dynamically and selectively process a user's voice relative to other ambient sounds. Some implementations include systems having: at least one microphone configured to capture acoustic signals; a wearable hearing assist device configured to amplify captured acoustic signals from the at least one microphone and output amplified audio signals to a transducer; a voice activity detector (VAD) configured to detect voice signals of a user from the captured acoustic signals; and a voice suppression system configured to suppress the voice signals of the user from the amplified audio signals being output to the transducer.

In additional particular implementations, methods of enhancing hearing assist are provided that include: capturing acoustic signals from at least one microphone; amplifying captured acoustic signals from the at least one microphone; outputting the amplified audio signals to a transducer on a wearable hearing assist device; detecting voice signals of a user from the captured acoustic signals using a voice activity detector (VAD); and suppressing the voice signals of the user from the amplified audio signals being output to the transducer.

Implementations may include one of the following features, or any combination thereof.

In some cases, the voice suppression system is configured to suppress the voice signals according to a method that includes: reducing amplification of the amplified audio signals being output to the transducer from a first level to a second level in response to a detection of voice signals of the user; and after reducing the gain of the at least one microphone to the second level, returning the gain of the at least one microphone to the first level in response to no detection of voice signals of the user.

In other cases, the voice suppression system is configured to suppress the voice signals according to a method that includes attenuating amplified audio signals being output in response to a detection of voice signals of the user.

In certain aspects, at least one microphone includes an off-head microphone and the voice suppression system is configured to suppress the voice signals according to a method that includes: muting the off-head microphone in response to a detection of voice signals of the user; and un-muting the off-head microphone in response to no detection of voice signals of the user.

In particular implementations, the system further includes an accessory in wireless communication with the wearable hearing assist device, wherein the voice suppression system is contained within the accessory.

In some cases, the wearable hearing assist device includes an ear bud and a processor configured to provide active noise reduction (ANR), and wherein the ANR is configured to remove occlusions.

In certain aspects, the VAD is contained in the wearable hearing assist device and the voice suppression system is configured to adjust beamforming in response to a detection of voice signals of the user by the VAD.

In some implementations, the beamforming forms a null directed toward a mouth of the user.

In certain cases, an accessory is provided in wireless communication with the wearable hearing assist device, wherein the VAD is contained within the accessory and comprises a machine learning model trained on a voice of the user, wherein the machine learning model is configured to identify the voice of the user.

In some implementations, the VAD measures an acoustic transfer function between an inside microphone and an outside microphone of a headset.

In certain aspects, at least one microphone is located at an accessory and the suppression system is configured to suppress the voice signals according to a method that includes: reducing a gain of the at least one microphone from a first level to a second level in response to a detection of voice signals of the user; and returning the gain of the at least one microphone to the first level in response to no detection of voice signals of the user.

In some implementations, active noise reduction (ANR) may be performed on the captured acoustic signals, wherein a first set of ANR filters optimized to reduce an occlusion are implemented in response to voice signals being detected and a second set of ANR filters optimized to reduce environmental noise are implemented in response to no voice signals being detected.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims

Figure 1:
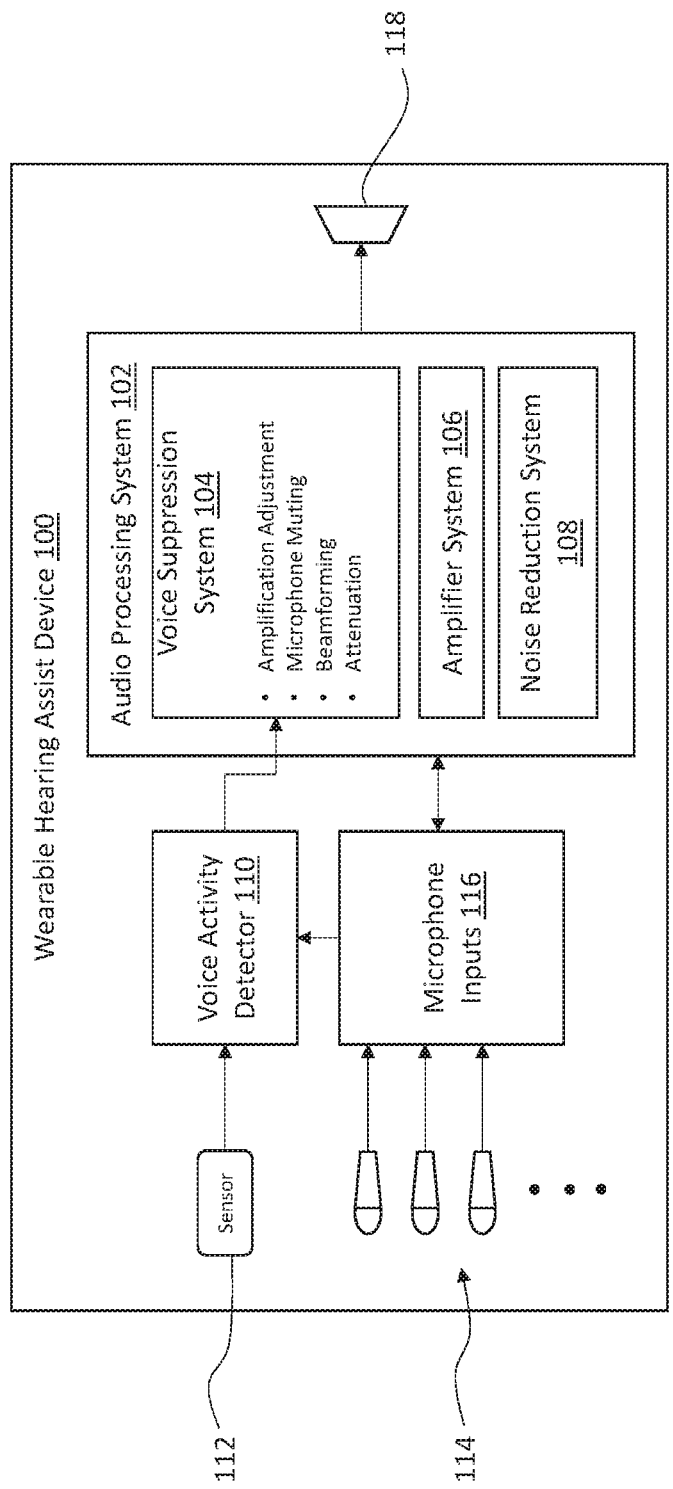
FIG. 1 depicts a block diagram of a wearable hearing assist device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various implementations describe solutions for processing a user's voice differently than other sounds in a wearable hearing assist device. In general, when using a hearing assist device, the user can be annoyed or otherwise irritated by amplification of the user's own voice. However, amplification of others' voices is critical for audibility. This issue can be more problematic in form factors where pickup microphones are closer to the user's mouth, such as with audio eyeglasses products. Also, people tend to be more sensitive to latency of signal processing applied to their own voice versus that of other users. Accordingly, to enhance the benefit of a hearing assist device and minimize annoyance, implementations treat the user's voice differently than other sounds.

Although generally described with reference to hearing assist devices, the solutions disclosed herein are intended to be applicable to a wide variety of wearable audio devices, i.e., devices that are structured to be at least partly worn by a user in the vicinity of at least one of the user's ears to provide amplified audio for at least that one ear. Other such implementations may include headphones, two-way communications headsets, earphones, earbuds, hearing aids, audio eyeglasses, wireless headsets (also known as "earsets") and ear protectors. Presentation of specific implementations are intended to facilitate understanding through the use of examples, and should not be taken as limiting either the scope of disclosure or the scope of claim coverage.

Additionally, the solutions disclosed herein are applicable to wearable audio devices that provide two-way audio communications, one-way audio communications (i.e., acoustic output of audio electronically provided by another device), or no communications, at all. Further, what is disclosed herein is applicable to wearable audio devices that are wirelessly connected to other devices, that are connected to other devices through electrically and/or optically conductive cabling, or that are not connected to any other device, at all. These teachings are applicable to wearable audio devices having physical configurations structured to be worn in the vicinity of either one or both ears of a user, including and not limited to, headphones with either one or two earpieces, over-the-head headphones, behind-the neck headphones, headsets with communications microphones (e.g., boom microphones), in-the-ear or behind-the-ear hearing aids, wireless headsets (i.e., earsets), audio eyeglasses, single earphones or pairs of earphones, as well as hats, helmets, clothing or any other physical configuration incorporating one or two earpieces to enable audio communications and/or ear protection.

In the illustrative implementations, the processed audio may include any natural or manmade sounds (or, acoustic signals) and the microphones may include one or more microphones capable of capturing and converting the sounds into electronic signals.

In various implementations, the wearable audio devices (e.g., hearing assist devices) described herein may incorporate active noise reduction (ANR) functionality that may include either or both feedback-based ANR and feedforward-based ANR, in addition to possibly further providing pass-through audio and audio processed through typical hearing aid signal processing such as dynamic range compression.

Additionally, the solutions disclosed herein are intended to be applicable to a wide variety of accessory devices, i.e., devices that can communicate with a wearable audio device and assist in the processing of audio signals. Illustrative accessory devices include smartphones, Internet of Things (IoT) devices, computing devices, specialized electronics, vehicles, computerized agents, carrying cases, charging cases, smart watches, other wearable devices, etc.

In various implementations, the wearable audio device (e.g., hearing assist device) and accessory device communicate wirelessly, e.g., using Bluetooth, or other wireless protocols. In certain implementations, the wearable audio device and accessory device reside within several meters of each other.

FIG. 1 depicts a block diagram of an illustrative wearable hearing assist device 100 according to various implementations. In the implementations shown, device 100 includes an audio processing system 102 having an amplifier system 106 configured to amplify acoustic signals received from one or more microphones 114 via microphone inputs 116, and output amplified audio signals via one or more electrostatic transducers 118. In some implementations, audio processing system 102 includes a noise reduction system 108, such as an ANR system, to reduce unwanted environmental noises. Any number of microphones 114 may be utilized (e.g., a microphone array), and may include, for example, on-head microphones such as in-ear, on-ear and/or off-ear microphones, e.g., that are contained in an earbud. Microphones 114 can also include off-head microphones that are spatially separated from the user's head, e.g., in audio eyeglasses, in a boom microphone extending from a headset or neckband, etc.

As noted herein, in providing hearing assistance, e.g., by amplifying ambient acoustic signals, amplifying the user's own voice in audio playback can be a source of annoyance or frustration. As one example, the user can hear their voice as uncharacteristically loud due to amplification. As another, frequency-dependent amplification can cause the user's own voice to sound spectrally unnatural. Further, latency in the hearing assistance device can cause a distracting delay in hearing their own voice. Additionally, occlusion of the user's ear with an in-ear device can result in amplification of lower frequencies of the user's own voice, resulting in an undesirable "boomy" quality, as is described by the so-called occlusion effect. To address this issue, audio processing system 102 further includes a voice suppression system 104 that processes voice signals of the user differently from other signals. In certain implementations, a voice activity detector (VAD) 110 is utilized to detect a voice of the user. VAD 110 may for example include or otherwise use a sensor 112 such as an accelerometer, bone conductive transducers, etc., that detects vibrations indicative of the user talking. Alternatively, VAD 110 may analyze a microphone signal to detect a user's voice.

Figure 4:
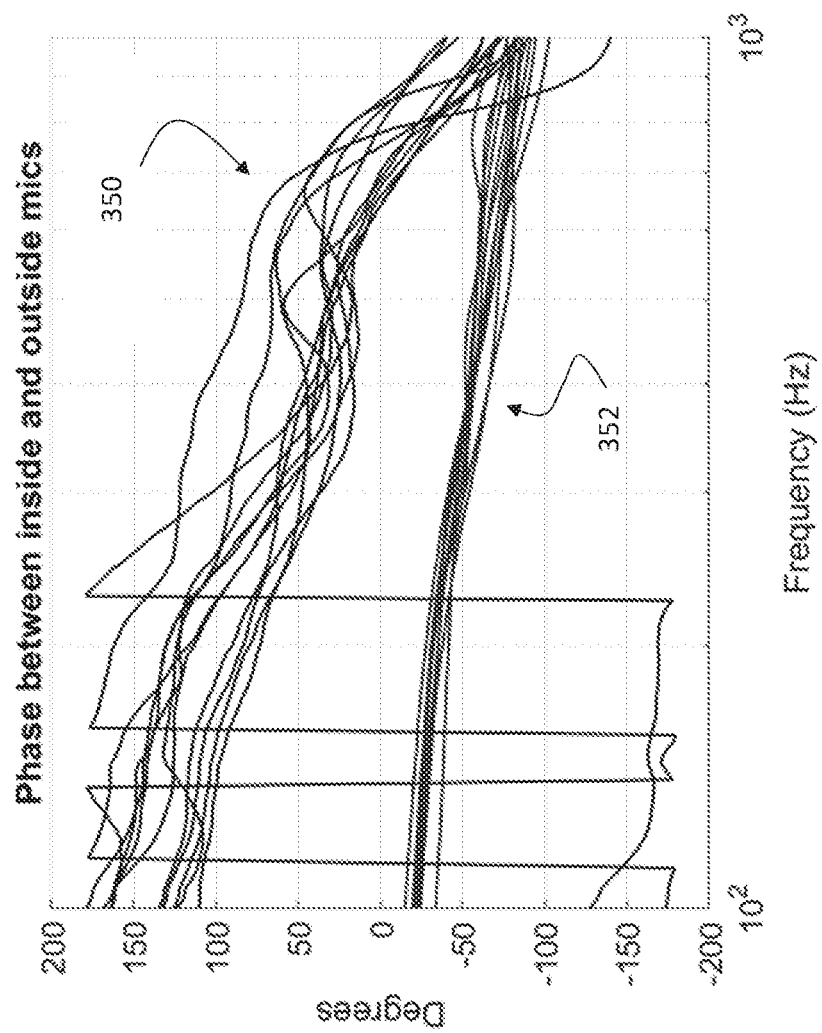
FIG. 4 depicts a chart showing phase characteristics of voice and external noise signals according to various implementations.

In some cases, VAD 110 can measure an acoustic transfer function between an inside (e.g., feedback) microphone and an outside (e.g., feedforward) microphone of a headset. In particular, a user's voice will have a much different signature than external noise when examining the phase difference between an inside and an outside microphone signal. An example of this is shown in FIG. 4 in which a first set of phase difference measurements 350 were captured from a user's voice, and a second set of phase difference measurements 352 were captured from external noise. As shown, between 250 and 600 Hz, the user's voice will typically exhibit a phase difference (between inside and outside microphones) of between 0 and 180 degrees. Conversely, external noise (i.e., noise not originating from the user, e.g., ambient noise such as traffic sounds, music, etc., or the voice of another person) will typically exhibit a phase difference of between −100 and 0 degrees. A negative phase indicates that the inside microphone signal is delayed relative to the outside microphone, and a positive phase indicates that the inside microphone receives the signal first. This relationship holds not only for in-ear ear buds that seal or nearly seal the user's ear canal, but also holds for less sealed wearable audio devices and around-ear headphones as well, due to the physics of airborne versus tissue-borne sound.

Accordingly, VAD 110 can be configured to capture the phase difference between two of the microphones 114, analyze the phase difference, and determine if the acoustic signal being captured is the user's voice or an external ambient acoustic signal. Any technique may be utilized to analyze the phase difference. In one approach, phase difference values from a few different frequencies are averaged, and then compared to a speech-versus-noise threshold to determine whether the signal is the user's voice or an external ambient acoustic signal.

Other approaches may likewise be utilized to identify the voice of the user. For example, a far field microphone signal used for beamforming can be compared with a near field microphone signal used for communications. In yet another approach, a local microphone signal can be compared with a remote microphone on an accessory.

In response to the VAD 110 detecting the voice of the user, the voice suppression system 104 institutes one or more actions to suppress the voice of the user in captured acoustic signals from the ambient environment. In some implementations, voice suppression system 104 interfaces with the amplifier system 106 to reduce amplification of the audio signals being output to the transducer 118 from a first level to a second level. When the VAD 110 no longer detects the user's voice, amplification is returned back to the first level. Although any amount of gain reduction can be utilized, a reduction of gain on the order of 10 dB, for example, reduces the negative impact of own-voice amplification without distracting attenuation of environmental sounds.

In other implementations, in response to detecting the user's voice, voice suppression system 104 mutes one or more of the microphones 114. For example, voice suppression system 104 can mute an off-head microphone when the user's voice is detected and then un-mute the off-head microphone when the user's voice is no longer detected. This approach is advantageous for open-fit devices, where the user maintains awareness of the surrounding environment while the device is muted since there is no passive insertion loss due to the device itself.

In still other implementations, in response to detecting the user's voice, voice suppression system 104 implements a beamforming strategy that, e.g., forms a null directed toward a mouth of the user. In these cases, the microphone inputs 116 are processed such that acoustic signals from the direction of the user's mouth are attenuated, thereby relatively enhancing acoustic signals detected in the remainder of the ambient environment. This results in a less distracting change to the environmental sound level, while still enabling attenuation of the user's own voice.

In still other implementations, in response to detecting the user's voice, voice suppression system 104 causes the noise reduction system 108 to take action to remove an occlusion. An occlusion effect occurs when an object fills or otherwise obstructs the outer portion of a person's ear canal, and that person perceives "hollow" or "booming" echo-like sounds of their own voice. This occlusion can be caused by bone-conducted sound vibrations reverberating off the object that fills or otherwise obstructs the ear canal. Active noise reduction (ANR) techniques that eliminate low frequency signals may be used to remove the occlusion. The noise reduction system may comprise two modes, one optimal for canceling environmental noise and one optimal for canceling the user's own voice, whereby the detection state of the user's voice determines which mode is activated. Thus, in one implementation, the function of the ANR can change depending on the detection of the user's voice by the VAD. If the VAD is active (i.e., voice is detected), a first set of ANR filters optimized to reduce the occlusion can be implemented and if the VAD is inactive (i.e., no voice is detected), a second set of ANR filters optimized to reduce environmental noise can be implemented.

In still other cases, in response to detecting the user's voice, voice suppression system 104 can be configured to attenuate the output signal to electrostatic transducer 118 to a specific level. This may for example include attenuating the output signal below the unaided sound pressure level of the user's voice, as would be the case without any active hearing assist device. In certain implementations, this may be accomplished in conjunction with ANR and may include a characterization of the user's un-aided voice effort level to establish a personalized gain reduction target.

Figure 2:
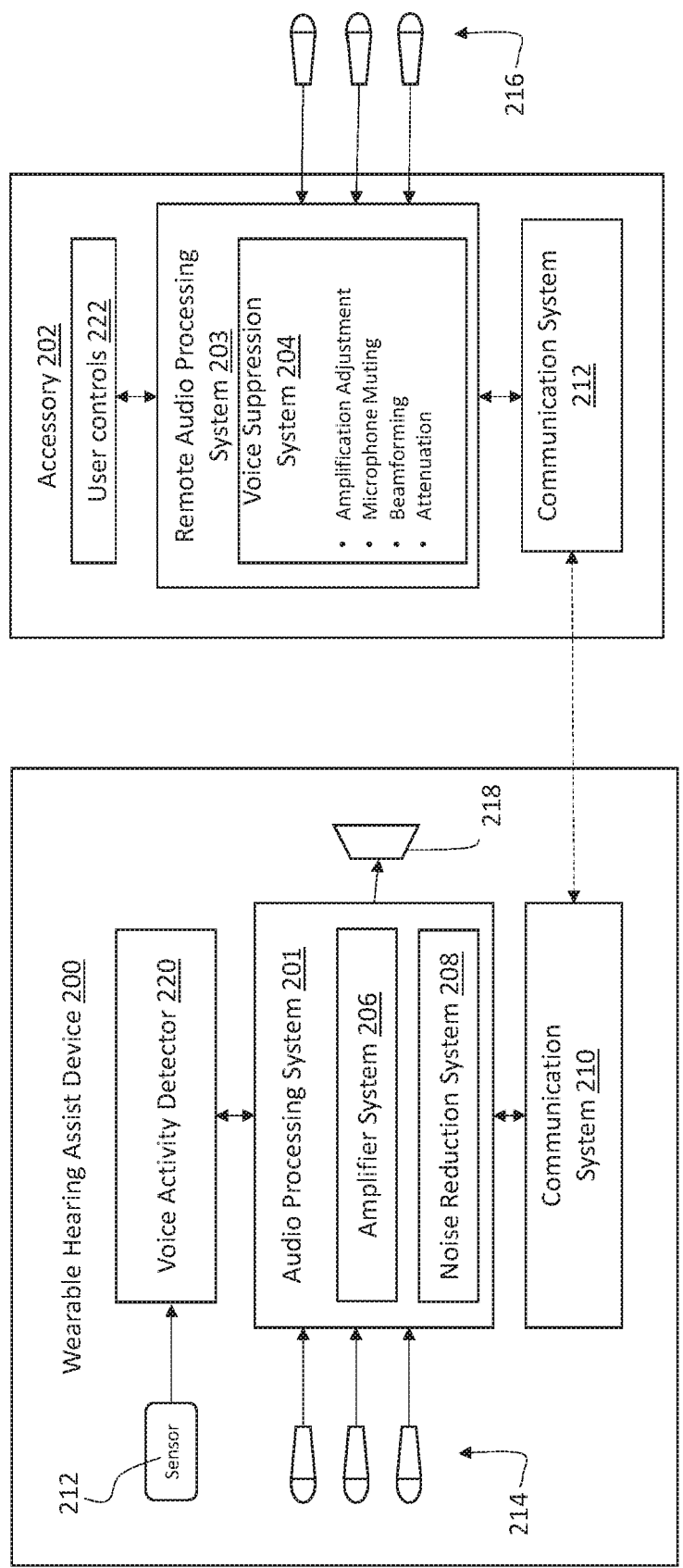
FIG. 2 depicts a system including a wearable hearing assist device and an accessory device according to various implementations.

In additional implementations, voice suppression can include distributed components. FIG. 2 depicts an example of a distributed voice suppression implementation that includes a wearable hearing assist device (device) 200 and an accessory 202 in communication with each other via communication systems 210, 212. Similar to the implementations of FIG. 1, device 200 includes one or more microphones 214, an audio processing system 201 that includes an amplifier system 206 and a noise reduction system 208, and one or more electrostatic transducers 218 for outputting amplified audio signals. Also included is a VAD 220 configured to detect the user's voice, similar to VAD 110 described with reference to FIG. 1.

In the depicted implementation in FIG. 2, however, the voice suppression system 204 resides in the accessory 202. In particular cases, the voice suppression system 204 can include a software program that is executed at the accessory 202. In certain implementations, in response to the VAD 220 detecting the user's voice (e.g., via sensor 212), a control signal is sent to the accessory 202 via communication systems 210, 212. In response to receiving the control signal from the audio processing system 201 (via communication systems 210, 212), the voice suppression system 204 takes one or more actions to suppress the user's voice, similar to those actions described with reference to the voice suppression system 104 in FIG. 1.

For example, upon detection of the user's voice, voice suppression system 204 can forward an amplifier control signal back to the device 200 instructing the amplifier system 206 to reduce amplification from a first level to a second level. When VAD 220 no longer detects the user's voice, a second control signal is sent to the accessory 202, and voice suppression system 204 forwards a second amplifier control signal back to the device 200 instructing the amplifier system 206 to return amplification to the first level. In certain implementations, user controls 222 are utilized to allow the user to set the first level and/or the second level.

In other implementations, accessory 202 may include one or more microphones 216 and a remote audio processing system 203 that captures and return acoustic signals back to the device 200 for amplification. Upon detection of the user's voice by VAD 220, voice suppression system 204 mutes one or more microphones 216. When the user's voice is no longer detected, the voice suppression system 204 unmutes the muted microphone(s) 216. In some implementations, voice suppression system 204 can also mute/unmute microphones 214 on the device 200.

In still other implementations, upon detection of the user's voice, voice suppression system 204 implements a beamforming strategy that directs a null using microphones 216 and/or microphones 214 toward the user's mouth.

In still other cases, in response to detecting the user's voice, voice suppression system 104 can be configured to attenuate the output signal to electrostatic transducer 218.

Figure 3:
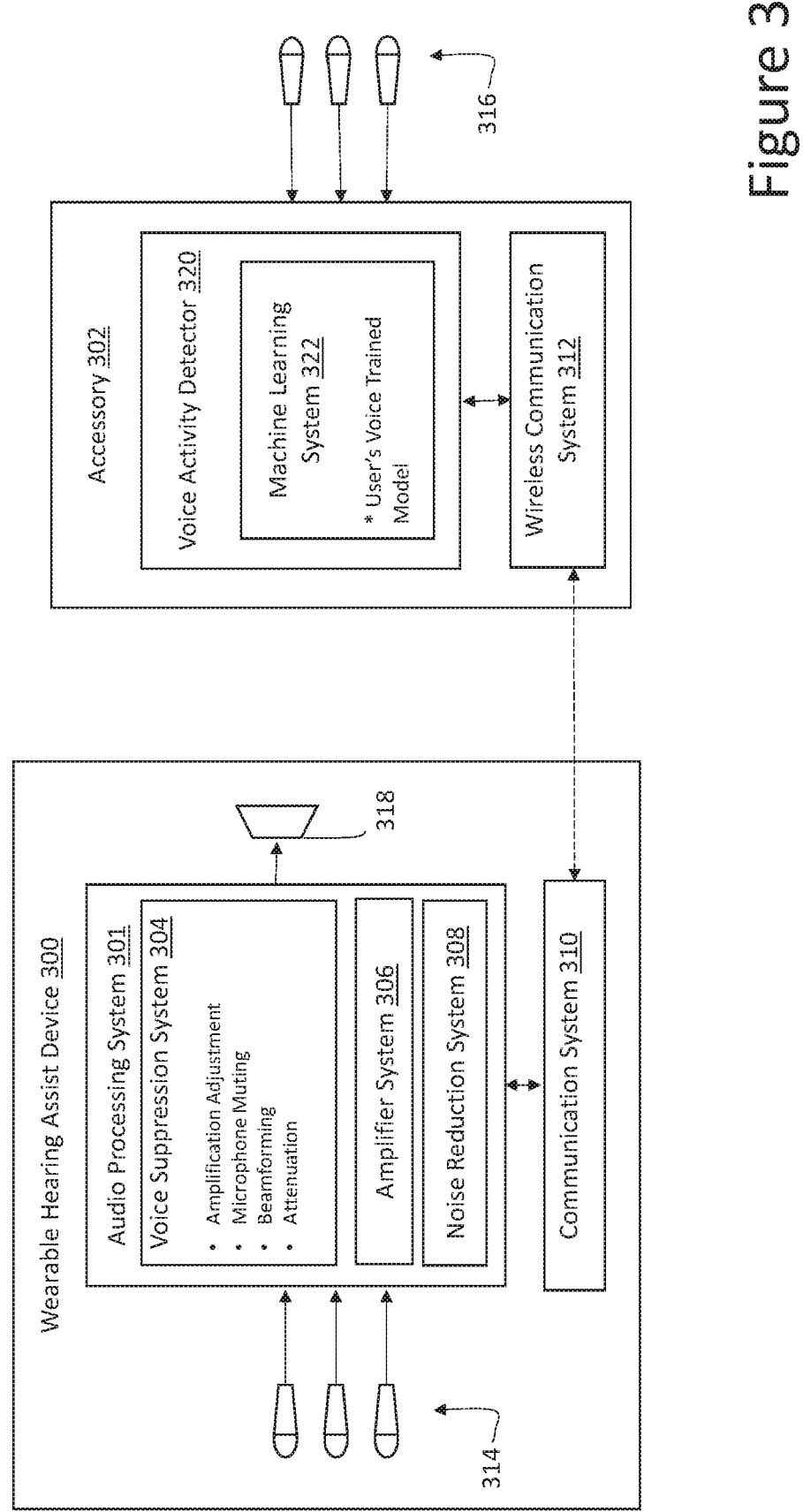
FIG. 3 depicts an additional system including a wearable hearing assist device and an accessory device according to various implementations.

FIG. 3 depicts a further implementation of a distributed voice suppression system that includes a wearable hearing assist device 300 and an accessory 302 in communication with each other via communication systems 310, 312. Similar to the implementations of FIG. 2, device 300 includes one or more microphones 314, an audio processing system 301 that includes an amplifier system 306 and a noise reduction system 308, and one or more electrostatic transducers 318 for outputting amplified audio signals. In this implementation, the voice suppression system 304 resides within the wearable hearing assist device 300.

In this implementation however, VAD 320 resides on the accessory 302. In certain implementations, VAD 320 detects the user's voice using a machine learning system 322. In some implementations, the machine learning system 322 includes a model trained on a voice of the user. Machine learning system 322 may utilize any approach to identify the user's voice, e.g., a deep recurrent neural network such as a long short-term memory (LSTM) architecture to classify time-series audio data to learn multiple aspects of the user's environment or a more simple supervised learning system, e.g., using Naïve Bayes classification to identify a user's voice. Regardless, during operation, acoustic inputs from one or more microphones 316 are evaluated against the model to determine if the user's voice is present. If the user's voice is present, a control signal is sent to the voice suppression system 304. Voice suppression system 304 receives the control signal and takes one or more actions to suppress the user's voice, similar to those actions described with reference to FIGS. 1 and 2.

For example, upon detection of the user's voice, voice suppression system 204 can instruct the amplifier system 306 to reduce amplification from a first level to a second level. When VAD 320 no longer detects the user's voice, a second control signal is sent to the voice suppression system 304, which instructs the amplifier system 306 to return amplification to the first level.

In other implementations, upon detection of the user's voice by VAD 320, voice suppression system 304 mutes one or more microphones 314, 316. When the user's voice is no longer detected, the voice suppression system 304 unmutes the muted microphone(s) 314, 316.

In still other implementations, upon detection of the user's voice by VAD 320, voice suppression system 304 implements a beamforming strategy that directs a null using microphones 314 and/or microphones 316 toward the user's mouth.

In still other cases, in response to detecting the user's voice, voice suppression system 104 can be configured to attenuate the output signal to electrostatic transducer 318.

The solutions described with reference to FIGS. 2 and 3 are intended to be applicable to a wide variety of accessories (e.g., accessories 202, 302), i.e., computing devices that can communicate with a wearable audio device and assist in the processing of audio signals. Illustrative devices include smartphones, Internet of Things (IoT) devices, computing devices, specialized electronics, vehicles, computerized agents, carrying cases, charging cases, smart watches, other wearable devices, etc.

In various implementations, the wearable hearing assist device 200, 300 and accessories 202, 302 communicate wirelessly, e.g., using Bluetooth, BLE, Wi-Fi, or other wireless protocols. In certain implementations, the wearable hearing assist device 200, 300 and corresponding accessory 202, 302 reside within several meters of each other, e.g., where the wearable hearing assist device is on the user's head and the accessory is worn on another body part of that user or otherwise carried by the user.

Using a distributed system such as those shown and described with reference to FIGS. 2 and 3, much of the computational complexity and power requirements are offloaded to the accessory 202, 302. This distributed approach can reduce power consumption and computational resource usage of the wearable hearing assist device 200, 300. Additionally, by reducing the resources required by the wearable hearing assist device 200, 300, more flexibility is afforded to the design (i.e., form factor) of the device 200, 300. For instance, the wearable device 200, 300 can be made smaller since fewer hardware components are required. This can be particularly beneficial in hearing assist devices, for which many users desire discrete form factors and long battery life It is understood that the wearable hearing assist devices (e.g., devices 100, 200, 300) shown and described according to various implementations may be structured to be worn by a user to provide an audio output to a vicinity of at least one of the user's ears. The devices may have any of a number of form factors, including configurations that incorporate a single earpiece to provide audio to only one of the user's ears, others that incorporate a pair of earpieces to provide audio to both of the user's ears, and others that incorporate one or more standalone speakers to provide audio to the environment around the user. Example wearable audio devices are illustrated and described in further detail in U.S. Pat. No. 10,194,259 (Directional Audio Selection, filed on Feb. 28, 2018), which are hereby incorporated by reference in its entirety.

In the illustrative implementations, the captured audio may include any natural or manmade sounds (or, acoustic signals) and the microphones may include one or more microphones capable of capturing and converting the sounds into electronic signals.

It is appreciated that while a few examples have been provided herein relating to suppressing a user's voice in a hearing assist device, other approaches, or combinations of described approaches can be used.

Figure 5:
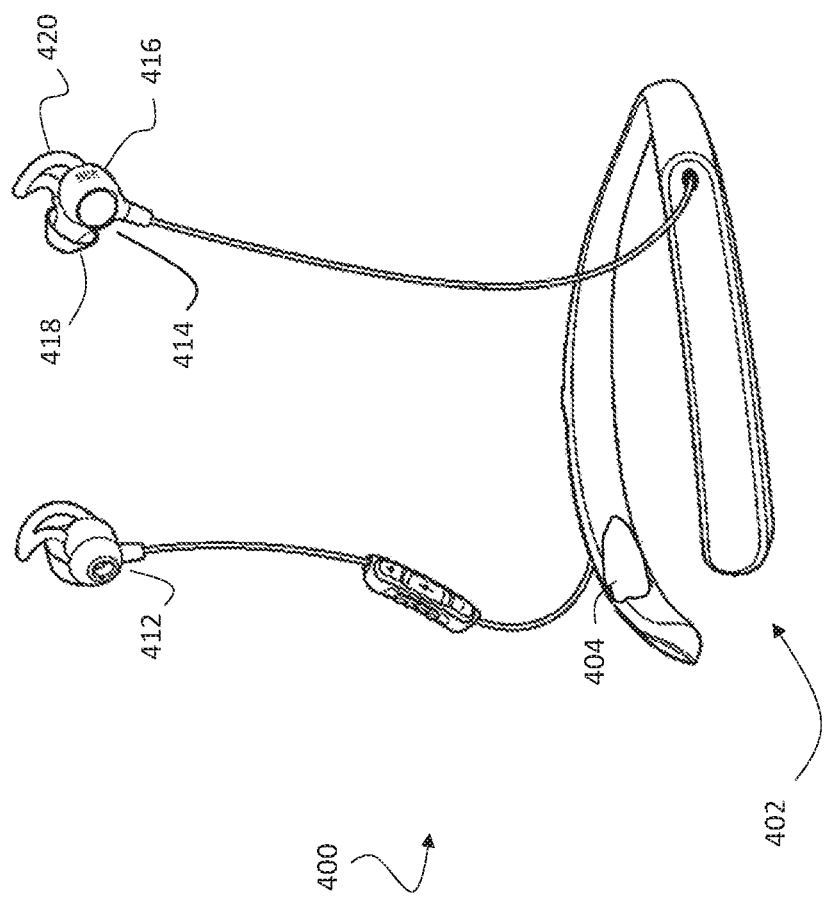
FIG. 5 depicts an example of a wearable hearing assist device according to various implementations.

FIG. 5 is a schematic depiction of an illustrative wearable hearing assist device 400 that includes a voice suppression system (e.g., such as voice suppression systems 104, 204 or 304) contained in housing 402. The voice suppression system can be one of, or can be executed on one or more of a variety of electronics 404 in the housing 402. In this example, the wearable audio device 400 includes an audio headset that includes two earphones (for example, in-ear headphones, also called "earbuds") 412, 414. While the earphones 412, 414 are tethered to a housing 402 (e.g., neckband) that is configured to rest on a user's neck, other configurations, including wireless configurations can also be utilized. Each earphone 412, 414 is shown including a body 416, which can include a casing formed of one or more plastics or composite materials. The body 416 can include a nozzle 418 for insertion into a user's ear canal entrance and a support member 420 for retaining the nozzle 418 in a resting position within the user's ear. In addition to the voice suppression system, the control unit 402 can include other electronics 404, e.g., an amplifier, batteries, user controls, a VAD, etc. In other cases, as noted above, a separate accessory (not shown) may wirelessly communicate with device 400 and offload various functionality described herein. Additionally, other wearable device forms could likewise be implemented, including around-the-ear headphones, over-the-ear headphones, audio eyeglasses, open-ear audio devices etc.

According to various implementations, a hearing assist device is provided that will suppress amplification the user's voice in order to enhance performance. A VAD is utilized to detect when the user is speaking, and cause the device to implement one or more voice suppression actions.

It is understood that one or more of the functions of the described systems may be implemented as hardware and/or software, and the various components may include communications pathways that connect components by any conventional means (e.g., hard-wired and/or wireless connection). For example, one or more non-volatile devices (e.g., centralized or distributed devices such as flash memory device(s)) can store and/or execute programs, algorithms and/or parameters for one or more described devices. Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

It is noted that while the implementations described herein utilize microphone systems to collect input signals, it is understood that any type of sensor can be utilized separately or in addition to a microphone system to collect input signals, e.g., accelerometers, thermometers, optical sensors, cameras, etc.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A system, comprising:
   at least one microphone configured to capture acoustic signals;
   a wearable hearing assist device configured to amplify the captured acoustic signals from the at least one microphone and output amplified audio signals to a transducer;
   a voice activity detector (VAD) configured to detect voice signals of a user from the captured acoustic signals; and
   a voice suppression system configured to suppress the voice signals of the user in the amplified audio signals being output to the transducer in response to a detected voice signal of the user, wherein the voice suppression system is configured to suppress the voice signals according to a method comprising: reducing amplification of the amplified audio signals being output to the transducer from a first level to a second level in response to a detection of voice signals of the user, and returning amplification to the first level in response to no detection of voice signals of the user.

2. The system of claim 1, further comprising an accessory in wireless communication with the wearable hearing assist device, wherein the voice suppression system is contained within the accessory.

3. The system of claim 2, wherein the VAD is contained in the wearable hearing assist device and the voice suppression system is configured to adjust beamforming in response to detecting the voice signals of the user by the VAD.

4. The system of claim 3, wherein the beamforming forms a null directed toward a mouth of the user.

5. The system of claim 2, wherein the wearable hearing assist device comprises:
   an ear bud configured to seal an ear canal of the user; and
   a processor configured to perform active noise reduction (ANR) on ambient acoustic signals, wherein the processor is configured to remove occlusions.

6. The system of claim 1, further comprising an accessory in wireless communication with the wearable hearing assist device, wherein the VAD is contained within the accessory and comprises a machine learning model trained on a voice of the user, wherein the machine learning model is configured to identify the voice of the user.

7. A computerized method of enhancing hearing assist, the method comprising:
capturing acoustic signals from at least one microphone;
amplifying captured acoustic signals from the at least one microphone;
outputting the amplified audio signals to a transducer on a wearable hearing assist device;
detecting voice signals of a user from the captured acoustic signals using a voice activity detector (VAD);
suppressing the voice signals of the user from the amplified audio signals being output to the transducer; and
performing active noise reduction (ANR) on the captured acoustic signals with a first set of ANR filters optimized to reduce an occlusion implemented in response to voice signals being detected, and a second set of ANR filters optimized to reduce environmental noise implemented in response to no voice signals being detected.

8. The method of claim 7, wherein suppressing the voice signals comprises:
reducing amplification of the amplified audio signals being output to the transducer from a first level to a second level in response to a detection of voice signals of the user; and
returning amplification to the first level in response to no detection of voice signals of the user.

9. The method of claim 7, wherein the at least one microphone comprises an off-head microphone and suppressing the voice signals comprises:
muting the off-head microphone in response to detecting voice signals of the user; and
un-muting the off-head microphone in response to no detection of voice signals of the user.

10. The method of claim 7, further comprising suppressing the voice signals using an accessory in wireless communication with the wearable hearing assist device.

11. The method of claim 10, wherein the VAD is contained in the wearable hearing assist device and suppressing the voice signals comprises adjusting beamforming in response to detecting the voice signals of the user with the VAD.

12. The method of claim 11, wherein the beamforming forms a null directed toward a mouth of the user.

13. The method of claim 10, wherein the wearable hearing assist device comprises an ear bud and a processor configured to provide active noise reduction (ANR), and wherein the ANR is configured to remove occlusions.

14. The method of claim 7, further providing an accessory in wireless communication with a wearable hearing assist device, wherein the VAD is contained within the accessory and includes a machine learning model trained on a voice of the user.

15. The method of claim 7, wherein the VAD measures an acoustic transfer function between an inside microphone and an outside microphone.

16. The method of claim 7, wherein the at least one microphone is located at an accessory and suppressing the voice signals comprises:
reducing a gain of the at least one microphone from a first level to a second level in response to detecting the voice signals of the user; and
after reducing the gain of the at least one microphone to the second level, returning the gain of the at least one microphone to the first level in response to no detection of voice signals of the user.

17. A system, comprising:
at least one microphone configured to capture acoustic signals;
a wearable hearing assist device configured to amplify the captured acoustic signals from the at least one microphone and output amplified audio signals to a transducer;
a voice activity detector (VAD) configured to detect voice signals of a user from the captured acoustic signals, wherein the VAD measures an acoustic transfer function between an inside microphone and an outside microphone; and
a voice suppression system configured to suppress the voice signals of the user in the amplified audio signals being output to the transducer.

18. A system, comprising:
at least one microphone configured to capture acoustic signals;
a wearable hearing assist device configured to amplify the captured acoustic signals from the at least one microphone and output amplified audio signals to a transducer;
a voice activity detector (VAD) configured to detect voice signals of a user from the captured acoustic signals; and
a voice suppression system configured to suppress the voice signals of the user in the amplified audio signals being output to the transducer in response to a detected voice signal of the user;
wherein the at least one microphone comprises an off-head microphone and the voice suppression system is configured to suppress the voice signals according to a method that comprises:
muting the off-head microphone in response to detecting voice signals of the user; and
un-muting the off-head microphone in response to no detection of voice signals of the user.

19. A system, comprising:
at least one microphone configured to capture acoustic signals;
a wearable hearing assist device configured to amplify the captured acoustic signals from the at least one microphone and output amplified audio signals to a transducer;
a voice activity detector (VAD) configured to detect voice signals of a user from the captured acoustic signals; and
a voice suppression system configured to suppress the voice signals of the user in the amplified audio signals being output to the transducer in response to a detected voice signal of the user;
wherein the at least one microphone is located at an accessory and the voice suppression system is configured to suppress the voice signals according to a method comprising:
reducing a gain of the at least one microphone from a first level to a second level in response to detecting the voice signals of the user; and
after reducing the gain of the at least one microphone to the second level, returning the gain of the at least one microphone to the first level in response to no detection of voice signals of the user.

* * * * *